Oct. 15, 1963   A. FRANKEL ETAL   3,107,046
TURBINES, BLOWERS AND THE LIKE
Filed July 14, 1959   3 Sheets-Sheet 1
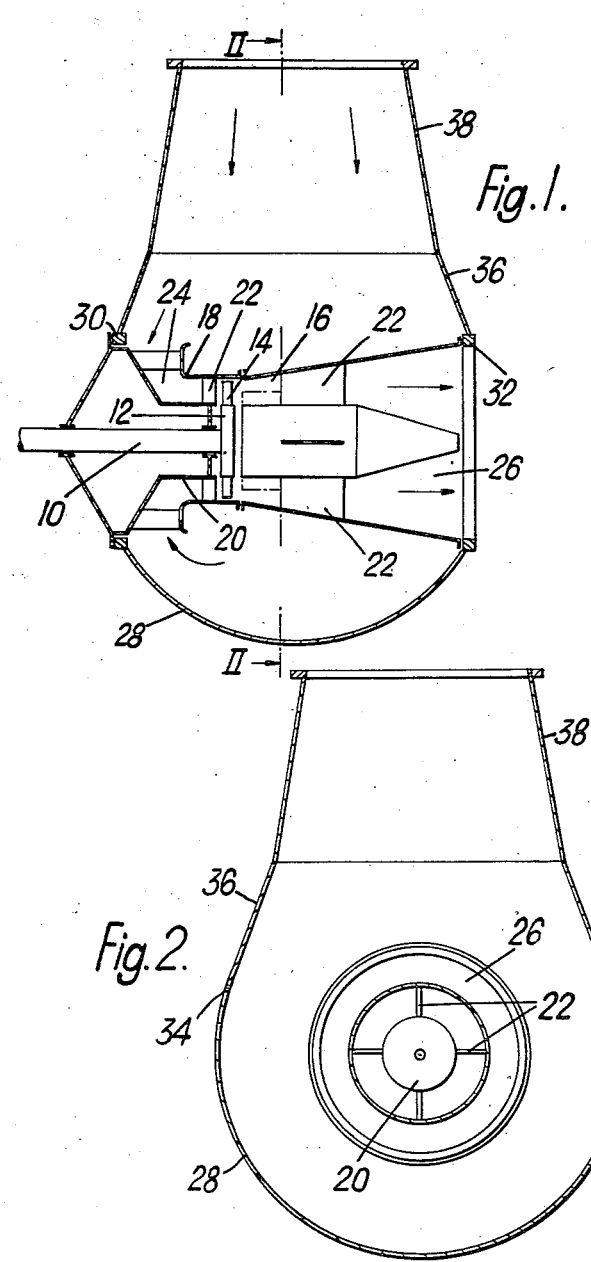

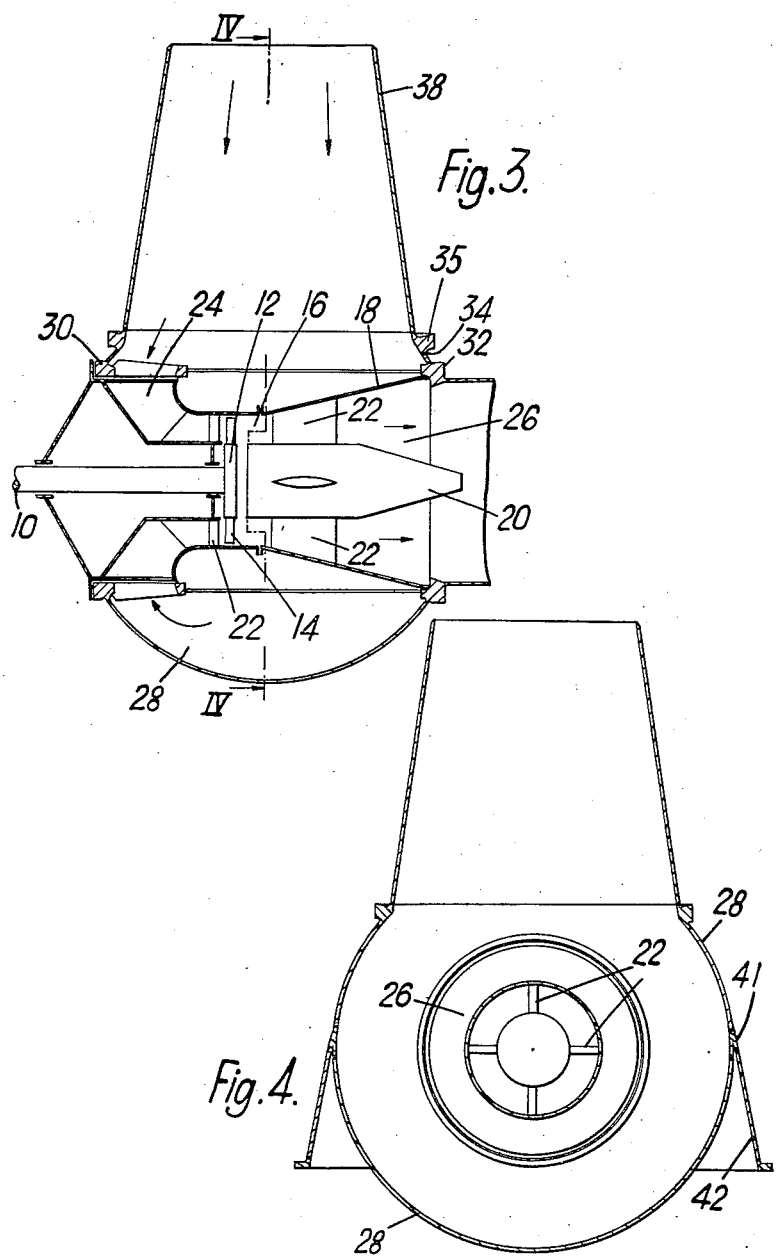

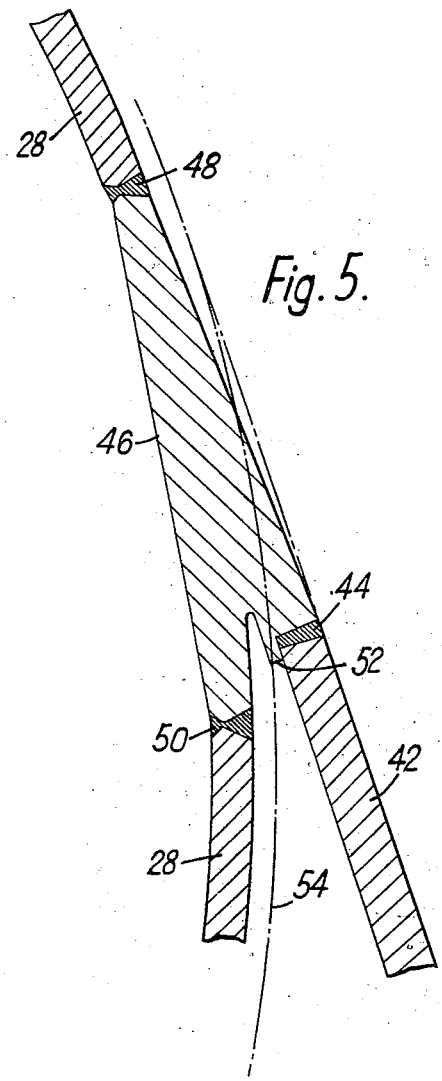

United States Patent Office 3,107,046
Patented Oct. 15, 1963

3,107,046
TURBINES, BLOWERS AND THE LIKE
Adolf Frankel, Gosforth, Newcastle-on-Tyne, and Jersy Andre Lorett, Leicester, England, assignors to Richardsons, Westgarth & Co. Limited, Wallsend, England
Filed July 14, 1959, Ser. No. 827,050
Claims priority, application Great Britain July 18, 1958
6 Claims. (Cl. 230—120)

This invention relates to turbines and rotary bladed compressors, pumps, blowers and like machines which, for the sake of convenience, will be referred to herein as rotary bladed turbo-machines.

The fluid-flow path in such a turbo-machine generally comprises annular casings which are located at either end of the machine and which encircle the annular passages leading into and/or out of the bladed section of the machine. In many instances the casings do not have to withstand any pressure greater than atmospheric pressure, so that their design and construction does not present any real problems. This statement does not, however, apply to a turbo-machine through which fluid under pressure is conveyed, for example, to a blower which is used in a nuclear power plant for circulating $CO_2$ under pressure. The casings of a turbo-machine of the last-mentioned type should therefore be designed in accordance with the principles governing the design of pressure vessels, and it is an aim of the present invention to provide a casing which meets these requirements and which is simple to manufacture.

According to the invention, a rotary bladed turbo-machine has an outer casing of substantially spherical shape, the word "spherical" being used herein to include casings which are not truly spherical but are part-spherical or truncated.

The main advantage of this construction is that it is a comparatively simple operation welding inlet and outlet ducts to the casing, especially when the welded joint between each duct and the casing is produced by a process of automatic machine "down-hand" welding. In most cases where the invention is used, the inlet and outlet ducts will be of circular cross-section, and the ducts will thus be joined to circular apertures in the casing prepared by a process of machine turning or boring a plane circular shape. Furthermore, the soundness of the circular weld which is formed can be easily determined by X-ray examination.

In order that the invention may be thoroughly understood, two single-stage, axial-flow blowers in accordance with it will now be described by way of example, with reference to the accompanying drawings, in which:

FIGURE 1 is a vertical section through the blower;
FIGURE 2 is a section taken on the line II—II in FIGURE 1;
FIGURE 3 is a vertical section through a blower similar to the blower illustrated in FIGURES 1 and 2, but including a support ring, a skirt and a modified intermediate duct;
FIGURE 4 is a section taken on the line IV—IV in FIGURE 3; and
FIGURE 5 is a cross-section of a joint between the support ring and the skirt, on an enlarged scale.

Referring first to FIGURES 1 and 2, the blower comprises a rotatable shaft 10 including a rotor disc 12 fitted with rotor blades 14 which rotate in an annular space 16 formed between an inner blower casing 18 and a hub 20. Guide blades or stator blades 22 are provided in the annular space 16 upstream of the rotor blades 14. In addition, stator blades may also be provided downstream of the rotor blades 14. Fluid under pressure is passed into the bladed section of the blower through an annular inlet passage 24. The fluid emerges from the blower through a diffuser 26 into an outlet duct—not shown. The joint between the diffuser 26 and the inner blower casing 18 is arranged to allow for axial differential expansion. Alternatively, the joint between the diffuser and a flange 32 may be arranged in this fashion. The fluid flow direction may be reversed in some instances.

The inner casing in blowers is usually housed in a substantially toroidal or cylindrical outer casing. Contrary to this construction, the inner casing and thus the fluid passages in a blower according to the invention are arranged in a substantially spherical casing 28 which is constructed of a number of suitably shaped and dished metal plates welded together. The casing 28 surrounds substantially the whole of the inner casing 18 and is connected thereto by a flange 30 located close to the inlet passage 24.

The arrangement is such that the axis X—X of the turbo-machine passes through the centre of the sphere, with the result that the diffuser of the machine lies radially to this centre. The casing 28 is truncated at 34 and at the outlet end of the diffuser 26, each truncation forming an inlet aperture and an outlet aperture respectively.

An inlet duct which includes intermediate ducts 36 and 38 is joined to the casing 28 at 34, and an outlet duct (not shown) is joined to the casing at the flange 32 at the outlet end of the diffuser 26. The mounting flanges and their associated ducts are arranged in such a way that their main axes intersect the centre of the casing 28. The flanges 30 and 32 constitute compensating rings. Each ring is circular and plane and is joined to the casing by a process of automatic machine down-hand welding. The joint between the intermediate ducts 36 and 38 is a flush-type butt-welded joint, and the duct 36 is joined tangentially to the casing so as to produce a smooth transition between the intermediate duct 36 and the casing 28. The welded joints are readily accessible and can be subjected to X-ray examination. Furthermore, both apertures in the casing form plane circles, and the edges to be joined together may be prepared by a process of machine turning or boring.

Turning now to FIGURES 3 and 4, it will be seen that the joint between the intermediate duct 38 and the casing 28 in the blower illustrated in these figures is located at a greater distance from the centre of the sphere than in the blower illustrated in FIGURES 1 and 2. In addition, the intermediate duct 36 has been omitted and the duct 38 is joined with the aid of a compensating ring directly to the casing 28. In this instance, the duct 38 is not arranged tangentially to the casing 28, although, if desired, the taper of the duct may be varied in such a manner as to produce a tangential joint. All abutting edges of the casing apertures and the ducts prior to being welded together are prepared by machine turning of plane circular shapes, and all welded joints are of flush-butt type and are accessible for X-ray examination.

To achieve uniform stress distribution and freedom from local thermal or pressure distortions, the support for the casing in the blower illustrated in FIGURES 3 and 4 is provided by a circumferential skirt 42 surrounding the entire casing but clearing the flanges 30 and 32. Alternatively, the skirt may be continuous and thus support the casing 28 around its entire circumference. In order to maintain the possibility of full X-ray examination of all welded joints, the skirt 42 is joined to a support ring 46 arranged in the equatorial plane of the casing 28, and replacing a circumferential section of the casing shell. The joint between the support ring 46 and the skirt 42 is shown in more detail in FIGURE 5. The ring 46 is a forging. Alternatively, the ring may be fabricated, i.e. a suitable piece of metal may be rolled and bent to the required shape. The inside of the ring corresponds substantially to the inner diameter of the casing 28, and its thickness at its joints 48 and 50 with the casing and with the compensating rings 30 and 32 is equal to the thickness of the casing shell, so that a flush-butt weld can be used. The ring is provided with a peripheral projection 52 on the outside formed in such a way as to allow a backing-ring type of weld 44 to the skirt 42.

Instead of being conical as illustrated, the skirt 42 may be cylindrical. Its length and thickness is determined in such a way as to enable it to withstand the weight and pressure loading without causing unduly high stresses due to possible thermal differential expansion between the shell and the case flange of the skirt 42. In order to further reduce the bending stresses and to render them independent of the temperature gradient in the skirt, the skirt may be provided with a number of vertical axial slots. The position of the ring 46 in relation to the sphere is determined so that the centre-line of the turbo-machine is maintained at a substantially constant height at varying temperatures of the casing. Thus, the skirt is not quite tangential to the casing 28, but makes a tangent with an imaginary sphere 54 which is concentric to the casing 28 and is of slightly greater diameter than the latter. This serves to relieve the casing shell from bending stresses otherwise imparted to the casing 28 by vertical loading through the skirt on the one hand and by differential thermal expansion between the skirt and the casing on the other hand. As a result, the stresses in the shell are uniform all over. The face of the base flange at the lower end of the skirt 42 is machined so as to be slightly conical and is clamped during final erection to a flat base. Thus a bending moment, which is capable of reducing stresses under operating conditions, is built into the skirt. The same effect may be achieved if, as an alternative, the flange face is of stepped configuration.

Due to its shape the casing 28 is capable of withstanding, relatively to its wall thickness, considerable internal pressure, and its essentially uniform wall thickness reduces the possibility of thermal stresses to a minimum. Furthermore, its substantially uniform curvature ensures that all parts of the casing are stressed substantially uniformly.

It is not essential that the casing 28 be made to surround the entire inner casing 18 and diffuser 26. It can, for example, surround only part of the length of the diffuser 26. It should be understood that, although the particular turbo-machine shown in the accompanying drawing is a single-stage axial-flow blower, the invention is applicable, as already stated, to other types of turbo-machines such as gas turbines, steam turbines and centrifugal rotary bladed compressors, recirculating and feed pumps and the like.

We claim:

1. A rotary turbo-machine comprising a rotor shaft; a bladed rotor on said shaft; a tubular casing surrounding said rotor and arranged coaxially with said shaft; said casing having a circumferentially opening fluid inlet passage axially communicating with one side of said rotor; said casing being open-ended and radially imperforate on the other side of said rotor, the open end of said casing forming a fluid outlet; a substantially spherical pressure-retaining outer casing surrounding said tubular casing in such relationship to said tubular casing that the center of said spherical casing lies generally on the axis of said rotor shaft; said spherical casing having a circular fluid inlet aperture the axis of which is disposed 90° from the rotor shaft axis; said spherical casing having a circular fluid outlet aperture; said spherical casing having a further circular aperture aligned with said circular outlet aperture and closed by and supporting one end of said tubular casing in sealed relation therewith; said fluid outlet aperture in said spherical casing communicating with said fluid outlet in said tubular casing and lying coaxially therewith; and the other end of said tubular casing being secured in sealed relation to the spherical casing at said spherical casing outlet aperture.

2. A turbo-machine according to claim 1 wherein said outer casing is in the form of a single unit.

3. A turbo-machine according to claim 1 wherein the axes of said inlet aperture and said outlet aperture in said outer casing intersect at the centre of said outer casing.

4. A turbo-machine according to claim 1 wherein said inlet aperture and said outlet aperture in said outer casing lead into an inlet duct and an outlet duct respectively, said ducts having axes intersecting at the centre of said outer casing.

5. A turbo-machine according to claim 1 wherein said outer casing comprises a plurality of metal plates welded together to form circular or arcuate welding seams between adjacent plates.

6. A turbo-machine according to claim 1 wherein said outer casing has a support ring located substantially at the equatorial portion of said outer casing, said support ring forming part of the shell of said outer casing and adapted to be joined to a skirt on which said outer casing is supported.

References Cited in the file of this patent

UNITED STATES PATENTS

| | | |
|---|---|---|
| 1,935,538 | Bauman | Nov. 14, 1933 |
| 2,327,841 | Hagen | Aug. 24, 1943 |
| 2,392,281 | Allen | Jan. 1, 1946 |
| 2,441,239 | Flanders | May 11, 1948 |
| 2,579,583 | Johnson | Dec. 25, 1951 |
| 2,583,374 | Hoffman | Jan. 22, 1952 |
| 2,653,754 | McDonald | Sept. 29, 1953 |
| 2,672,279 | Willgoos | Mar. 16, 1954 |
| 2,732,999 | Stalker | Jan. 31, 1956 |
| 2,844,304 | Busquet | July 22, 1958 |
| 2,851,214 | Busquet | Sept. 9, 1958 |

FOREIGN PATENTS

| | | |
|---|---|---|
| 814,809 | Great Britain | June 10, 1959 |